May 2, 1961 H. BERKENHOFF 2,982,172
FILM AND SOUND PROJECTION
Filed Aug. 9, 1955 2 Sheets-Sheet 1

INVENTOR.
HEINZ BERKENHOFF
BY Ostrolenk, Faber,
Gerb, & Soffen
ATTORNEYS

May 2, 1961  H. BERKENHOFF  2,982,172

FILM AND SOUND PROJECTION

Filed Aug. 9, 1955  2 Sheets-Sheet 2

INVENTOR.
HEINZ BERKENHOFF
BY Ostrolenk, Faber,
Gerb & Soffen
ATTORNEYS

United States Patent Office 2,982,172
Patented May 2, 1961

2,982,172

FILM AND SOUND PROJECTION

Heinz Berkenhoff, Koln-Holweide, Germany, assignor to Steatit-Magnesia Aktiengesellschaft, Lauf, Germany, a corporation of Germany Filed Aug. 9, 1955, Ser. No. 527,281

2 Claims. (Cl. 88—16.2)

The invention relates to motion picture projectors, especially narrow-film projectors, where the film is guided between aperture and take-up reel by means of a stabilizer, having built-in sound recording and reproduction equipment. A primary object of my invention is, therefore, to provide an improved narrow film projector.

A further object of this invention is to provide a novel narrow film projector wherein the sprocket speed is controlled by a loop of the film formed between the aperture and a stabilizer.

These and other objects of my invention will be apparent when taken in connection with the drawings in which:

The drawings illustrate the ways in which this invention may be executed.

Figure 1:
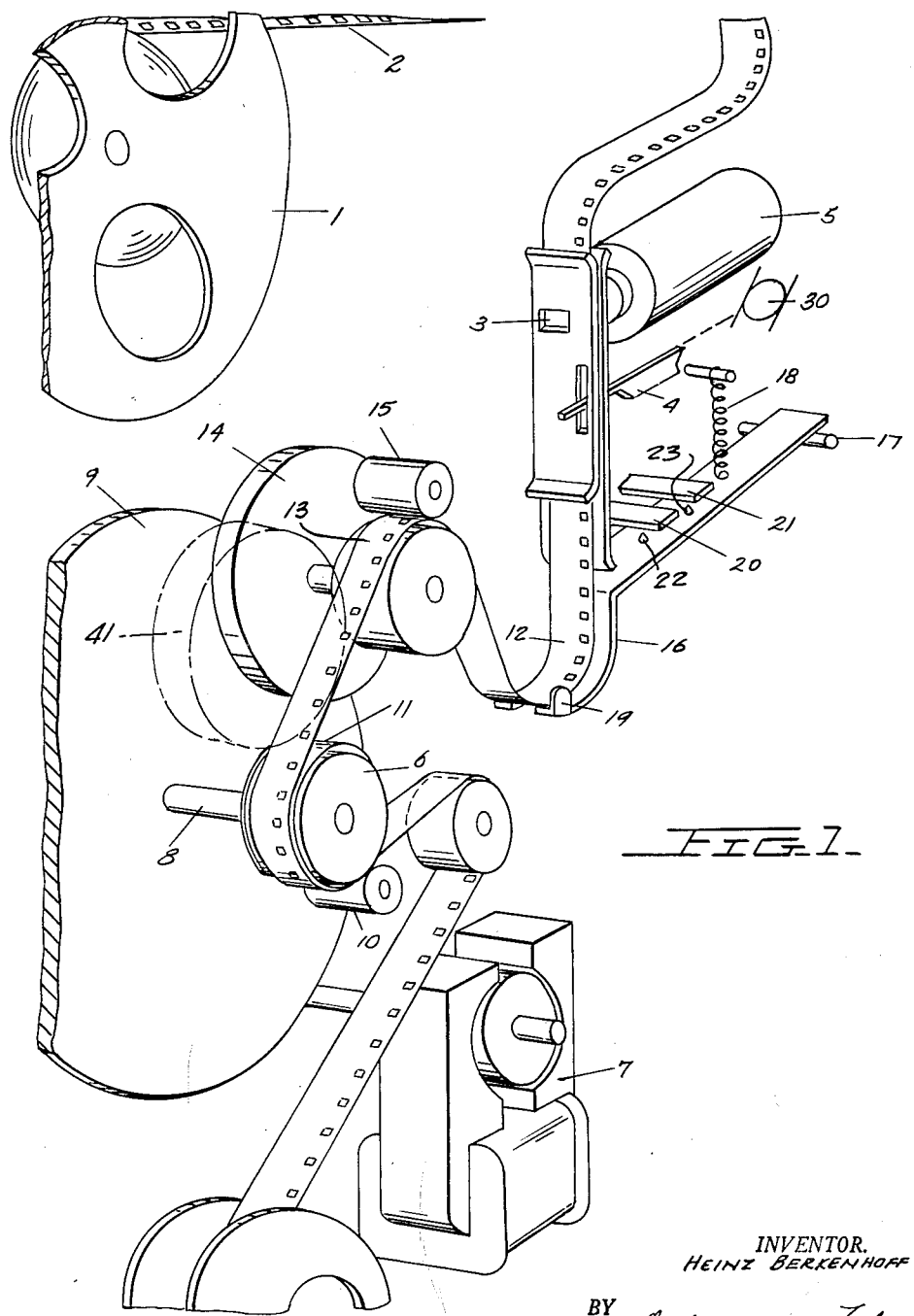
Fig. 1 is a diagram showing the running of the film in a motion picture projector constructed according to this invention.

The film 2, is guided from a take-off reel 1 over a stabilizing or pre-winding mechanism and is gradually moved, when in the range of the aperture 3, at a speed corresponding to the frequency of the picture by the sprocket 4 which is driven by one of the two motors not shown on Figure 1. In so doing the film slides along the aperture 3, in front of which the lens is arranged, and is fed to the take-up reel by the stabilizer 6 at constant speed. Lens 5 is aligned with aperture 3. The stabilizer 6 is driven by the second motor 7 at a constant speed. In order to stabilize the speed of the stabilizer 6, its shaft 8 carries a flywheel mass 9 which is driven by the motor 7. In order to guide the film safely over the stabilizer 6, a pressure roller 10 press the film 2 against a layer 11 of the stabilizer 6 which increases the friction between layer 11 and the film 2. Between the aperture and the stabilizer 6 the film forms a loop 12, which compensates by its elasticity the impulses of the sprocket 4, which feeds the film, advancing it in accordance with the frequency of the picture, to a guide roller 13. In order to stabilize the film, the guide roller 13 carries on its shaft a flywheel mass 14. In order to prevent the lifting of the film 2 off the guide roller 13, a pressure roller 15 presses the film firmly against the guide roller 13. As the stabilizer 6 is also to be used as part of the sound and reproducing means, it must, therefore, have a constant speed, it is necessary to adjust the speed of the sprocket automatically to this speed. For example, a sprocket-driving motor which is running too fast would make the loop 12 constantly larger, while a sprocket-driving motor which is running too slowly would make the loop 12 smaller and would finally stop the sound roller. The invention uses such changes in the loop of the film for controlling the speed of the sprocket-driving motor. This control is carried out by a contact member 16 which is adjusted to the shape of the loop. The control can take place either by the pressure exerted by the loop on the contact member or by pull; in the example of Fig. 1 this is done by pressure. The contact member 16 is rounded or is adjusted to the shape of the loop and receives the loop so that the loop exerts pressure on contact member 16.

In order to utilize the pressure of the loop 12 and to create a sensitive control mechanism, the invention provides for rounding at one end of the contact member 16, which is constructed as a one-armed lever. By means of the lateral projections 19 which run conically outward and which fit elastically against the edges of the film, the film is laterally guided in the loop 12 and is kept in contact with the contact member 16. The contact member 16 is movably placed about the pivot 17 and when free to move under the influence of spring 18, the contacts 22 and 23 on member 16 will engage contacts 20 and 21.

Figure 2:
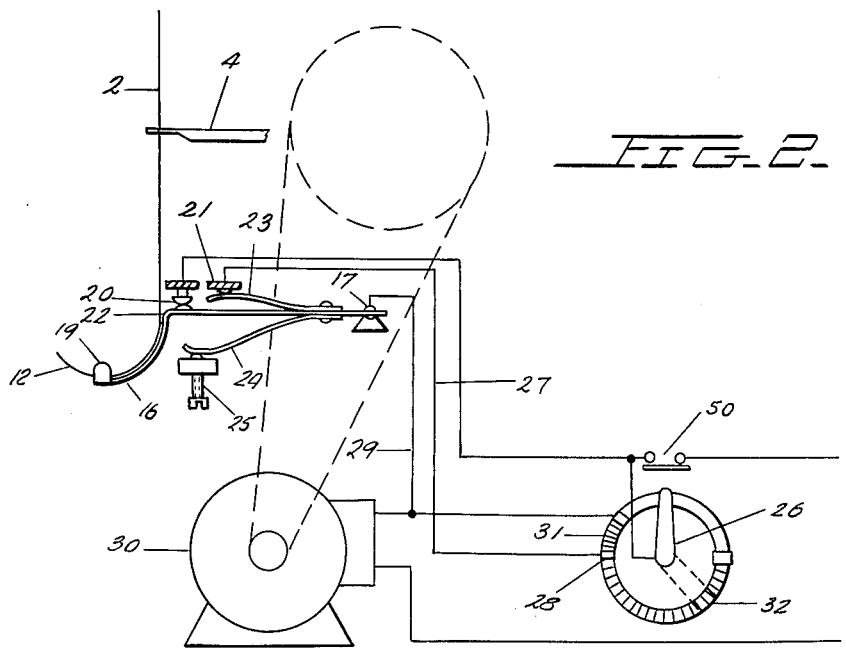
Fig. 2 is a diagram showing the control device in accordance with the invention for synchronizing the speed of the picture sprocket to the speed for the sound portion.

In the control device shown in Figure 2 the contact member 16 has two contacts 22 and 23, which cooperate with the stationary contacts 20 and 21. A leaf spring 24 has the effect that the contact 22 is pressed against the contact 20 and the contact 23 against the contact 21. An adjusting screw 25 serves to adjust the compressive force of the leaf spring 24. Contact 20 is in guiding contact with one pole of a switch 50 on the one hand, and with a contact blade 26 of a resistance regulator on the other. The other contact 21 is connected with a point 28 of the resistance regulator by a cable 27. The contact member 16 is electrically connected, by way of a cable 29, both to the one pole of the sprocket-driving motor 30 and to the one end of the resistance regulator. Resistance 31 is situated between this end of the resistance regulator and the point 28.

The narrow-film projector illustrated in Figs. 1 and 2 operates in the following manner.

When the switch 50 is closed and, simultaneously the contact blade 26 exerts pressure in clockwise direction on the path of resistance 32 of the resistance regulator, the film which has been placed into the motion picture projector is moved at the picture frequency by the sprocket 4. At the same time, the stabilizer 6 which is driven at constant speed by the motor 7 pulls the film with constant speed from the guide roller 13, this latter being also turned to constant speed. The take-up reel winds up the film fed to it, by way of a slipping (or friction) coupling (not shown).

Initially movable contacts 22 and 23 are in engagement with the stationary contacts 20 and 21. This has the result of supplying full voltage to the sprocket-driving motor 30 by way of the switch 50, the contact 20 and 22 as well as the contact member 16 and the cable 29. Due to the increased number of revolutions of the sprocket-driving motor 30, the speed of the sprocket is at first great. Consequently, the film 2 is fed at a faster rate than the median rate during this operation to the rollers 6 and 13 which are driven at a constant number of revolutions. Due to the fact that the pressure roller 15 prevents the film 2 from being lifted off the guide roller 13 and that the guide roller will forward only as much film as the stabilizer 6 transports, the feed rate of the sprocket which is now greater than the take up rate causes an increase in the loop 12.

As the film is more or less held fast at the edges—and preferably at the vertex of the loop 12—by the two elastic projections 19 and as it is thereby braked in its conveying motion, that part of the loop 12, which is on the right side (according to Fig. 2) of the projections 19, now presses on the contact member 16 and moves member 16 about its pivot 17, in a counter-clockwise direction, This has the effect of opening the pair of contacts 20 and 22. This interrupts the direct flow of current from the contact 20 to the contact member 16 and the cable 29, so that the flow of current to the motor 30 now runs from the switch 50, to the contact blade 26, which is on the path of resistance 32, to the sector of the path of resistance 32 to the point 28, the cable 27 and contacts 21 and 23, to the cable 29. The motor 30, therefore, only receives the line voltage which is reduced by the voltage drop caused in the resistance sector 32 and its number of revolutions thus becomes smaller.

As the projections 19 have been constructed conically, widening outwardly, with increasing speed of the sprocket, the film presses deeper into the rounding between the conical projections 19, thereby increasing the braking effect. This increased checking of the film between the projections 19 causes, in turn, an increase in the pressure of the right part of the loop 12 (Figure 2) on the contact member 16 which is thereby swung still further in a counter-clockwise direction. This further swinging finally results in opening the pair of contacts 21 and 23, which have so far short-circuited the resistance 31. The voltage of the motor which is now considerably reduced causes a strong drop in the number of revolutions. The sprocket, therefore, moves the film at slow speed, and the loop 12 becomes smaller. The leaf spring 24 now pushes the contact member 16 upward thereby closing the pair of contacts 21 and 23. This causes the voltage of the motor to increase correspondingly, and the increasing number of revolutions of the motor accelerates the pace of the sprocket. Due to this increase in the speed of the sprocket, the size of the loop 12 changes, and the regulating process starts anew.

Each time when the loop starts to swing the contact member 16 in a counterclockwise direction, i.e., when the speed of the sprocket is increasing, the loop places itself gradually into the rounding of the contact member. At relatively high speeds of the sprocket, i.e., when the film is strongly braked between the projections 19, the film will fit completely into the rounding of the contact member. This condition practically never occurs during operation, because even lighter pressures of the loop on the contact member will cause a faultless automatic regulation of the speed of the sprocket.

This regulation as described above will take place in such a way that the pressure of the loop will cause no disturbing mechanical reaction as regards the position of the picture in the aperture 3. The elasticity of the film, by causing it to fit gradually into the rounding of the contact member, brings about an effective adjustment of the speed of the sprocket. That is, the adjustment will automatically arrive at a most favorable point at which the loop of the film assumes a certain shape and a certain position in the rounding of the contact member and between the two elastic projections 19.

It also comes within the scope of this invention to generate the various electric voltages not only by means of series resistances, but by means of variable tappings of the secondary winding of a line transformer.

It is also possible to extend the contact member 16, which is placed in the pivot 17, beyond this point. The extended leg of the contact member 16 which is lifted during the switching process, could be used, according to the invention, for mechanically braking the drive of the sprocket. If the leg has the correct length, the braking effect due to the pressure of the loop 12 is considerable.

By using an additional motor for driving the stabilizer 6, it becomes possible to use this second motor 7 for driving the take-up reel. This makes it possible—if the sprocket-driving motor 30 is switched off—to operate the sound part of the sound projector as an independent magnetic sound apparatus. In this case, it becomes necessary to guide the sound film from the take-off reel 1 directly around the pressure roller 15 over the guide roller 13 and the stabilizer 6 as well as around the pressure roller 10 to the take-up drum. A guide—not shown on the drawing—which is additionally arranged in front of the pressure roller 15 can regulate the position of the sound film to the sound heads. As the width of the sound track of 8 mm. narrow-films amounts to only about 1 mm., it is possible to accommodate several sound tracks on one sound film of usual size.

Figure 3:
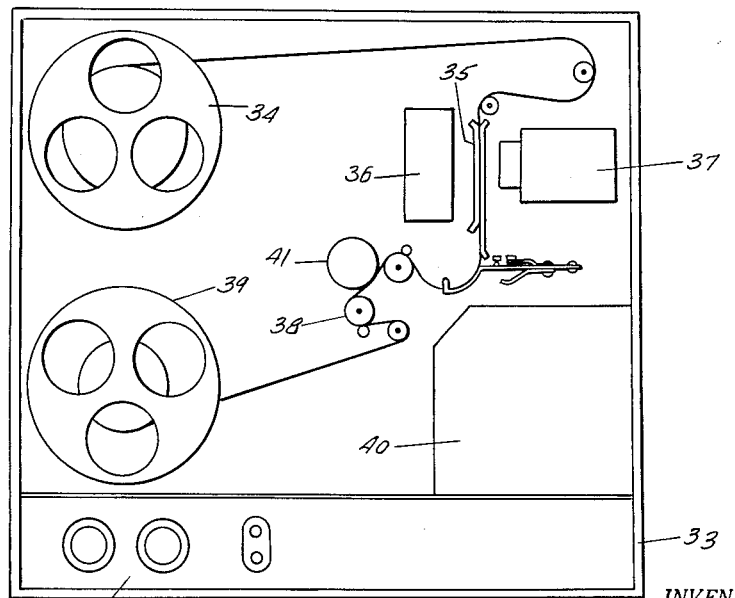
Fig. 3 shows a side elevation of a portable projector with sound reproducing equipment according to the invention.

In Fig. 3, the motion picture projector of the invention is constructed to be portable with the electrical apparatus necessary for reproducing the magnetic recordings being accommodated in the case.

In a case 33 standing on its narrow side the following equipment, required for optical reproduction, is arranged in the familiar manner: take-off reel 34, projector head 35, arc lamp 36, lens 37, stabilizer 38, take-up reel 39 as well as electrical wiring 40. Since a sound part is built into the case, such as a magnetic sound part utilizing stabilizer 38 as a sound roller, it is convenient to include electrical recording and reproduction devices such as the sound head arrangement 41 and amplifier 42 with sound head 41 containing recording, reproducing and erasing heads as in the ordinary magnetic sound apparatus. Amplifier 42 is supplied with control knobs 44 and loud speaker 43 that is mounted within a detachable side wall 45 of case 33. Handle 46 is provided for convenience in removing portion 45 of the side wall upon which loud speaker 43 is mounted. According to the invention, these parts are combined in one structural unit and are built into the case of the motion picture projector. This has the advantage that the humming which often occurs in low-frequency amplifying is limited to a minimum and the production and assembly are simplified.

The narrow-film projector of this invention has, among others, the important advantage that any sound apparatus can be built into it because it is possible to adjust, by means of the control device of the invention, the speed of the sprocket 4 to the speed of the sound carrier, such adjustment taking place automatically.

I claim:

1. A mechanism for synchronizing picture projection feed speed with sound recording feed speed of a film tape which comprises a rockable lever having a free end disposed for pressure engagement by a moving tape, said lever being rockable by a loop of said film responsive to slack or tautness effecting size change in that portion of the loop of film engaging said free end, a projector feed means ahead of said lever comprising an electric motor, contact means carried by said lever engageable with respective fixed contact means, a circuit means controlled by said contact means for controlling the speed of said motor in response to the position of said lever as determined by pressure engagement with said film, including sound recording drive means of constant speed beyond said lever disposed to feed said film at substantially non-varying speed, whereby any change in speed of said film after leaving said projector feed means affects the size of said loop to actuate said lever.

2. A mechanism for synchronizing picture projection feed speed with sound recording feed speed of a film which comprises a rockable lever having a free end disposed for pressure engagement by a moving film, said lever being rockable by a loop of said film responsive to slack or tautness effecting size change of the loop of film engaging said free end, a projector feed means ahead of said lever comprising an electric motor, contact means carried by said lever engagable with respective fixed contact means, a circuit means controlled by said contact means for controlling the speed of said motor in response to the position of said lever as determined by pressure engagement with said film, including sound recording drive means of constant speed beyond said lever disposed to feed said film at substantially non-varying speed, whereby any change in speed of said film after leaving said projector feed means changes the size of said loop to press or release said lever, said contact means comprising a pair of contacts carried by said lever and engageable with said respective fixed contact means, said circuit means comprising resistance elements connected to respective fixed contact means, said resistance elements being connected to said motor means to effect speed control thereof responsive to engagement of the contact means carried by said lever with the respective fixed contact means in accordance with movement of said lever effected by the size of said loop.

References Cited in the file of this patent

UNITED STATES PATENTS

| | | |
|---|---|---|
| 1,791,450 | Kellogg | Feb. 3, 1931 |
| 2,023,770 | Riess et al. | Dec. 10, 1935 |
| 2,099,987 | Murdock | Nov. 23, 1937 |
| 2,243,112 | Morrissey | May 27, 1941 |
| 2,308,260 | Bakos | Jan. 12, 1943 |
| 2,317,921 | Leach | Apr. 27, 1943 |
| 2,379,489 | Kreuzer | July 3, 1945 |
| 2,382,116 | Victor | Aug. 14, 1945 |
| 2,773,416 | Kleinerman | Dec. 11, 1956 |

FOREIGN PATENTS

| | | |
|---|---|---|
| 714,732 | Great Britain | Sept. 1, 1954 |
| 695,041 | France | Sept. 23, 1930 |